United States Patent [19]

Walloch

[11] 4,413,980
[45] Nov. 8, 1983

[54] FLEXIBLE GRID COUPLING

[75] Inventor: Richard G. Walloch, Muskego, Wis.

[73] Assignee: The Falk Corporation, Milwaukee, Wis.

[21] Appl. No.: 237,843

[22] Filed: Feb. 24, 1981

[51] Int. Cl.³ .......................... F16D 3/50; F16D 3/56
[52] U.S. Cl. ...................................... 464/82; 464/71; 464/76; 464/83; 464/93
[58] Field of Search .................... 464/54, 61, 77–79, 464/76, 81, 84, 86, 100, 71, 72, 92, 93, 82, 83, 85

[56] References Cited

U.S. PATENT DOCUMENTS

| | | | |
|---|---|---|---|
| 1,587,403 | 6/1926 | Nicholson | 464/81 |
| 1,668,586 | 5/1928 | Dalton | 464/81 |
| 1,692,978 | 11/1928 | Dunham | 464/81 |
| 1,763,842 | 6/1930 | Bibby | 464/54 |
| 1,887,070 | 11/1932 | Steele et al. | 464/81 |
| 1,939,207 | 12/1933 | Duckworth | 464/85 |
| 2,540,703 | 2/1951 | Wellauer | 464/85 X |
| 2,555,909 | 6/1951 | Wellauer | 464/54 |
| 2,593,877 | 4/1952 | Hagenlocher | 464/93 X |
| 2,619,211 | 11/1952 | Belden | 464/72 X |
| 2,696,719 | 12/1954 | Sklar | 464/85 |
| 2,924,082 | 2/1960 | Reich | 464/92 X |
| 2,958,213 | 11/1960 | Donner | 464/83 |
| 3,019,622 | 2/1962 | Fermier | 464/86 |
| 3,079,773 | 3/1963 | Schmitter | 464/54 |
| 3,196,635 | 7/1965 | Schmitter | 464/54 |
| 3,304,743 | 2/1967 | Paulsen | 464/72 |
| 3,434,303 | 3/1969 | Leyer | 464/83 X |
| 3,677,033 | 7/1972 | Kneeland | 464/85 |
| 4,214,458 | 7/1980 | Philleo | 464/85 |

*Primary Examiner*—John Petrakes
*Attorney, Agent, or Firm*—Quarles & Brady

[57] ABSTRACT

A flexible shaft coupling includes a pair of hubs connected to the shafts. Each hub has a series of peripherally spaced teeth with slots between the teeth. A grid joins the hubs and transmits torque therebetween. The grid is formed of a series of spaced, straight metal rungs held together at their ends by elastomer members.

4 Claims, 6 Drawing Figures

FLEXIBLE GRID COUPLING

BACKGROUND OF THE INVENTION

This invention relates to shaft couplings, and more particularly to improvements in couplings of the type which utilizes a grid which includes metal rungs joining the coupling halves.

A common form of flexible coupling used for joining driving and driven shafts employs a metal grid to join coupling halves mounted on the shafts being coupled. The grid is usually in the form of a serpentine with straight grid rungs joined together at alternate ends by integral end loops. The rungs are received in radially aligned, axially extending slots formed between teeth on each of the coupling hubs and the rungs span the space between the coupling halves. The rungs act as beams and the side walls of the teeth are generally curved in an axial direction so that as the torsional load transmitted between the coupling halves increases the unsupported length of each rung is reduced. An example of this type of flexible coupling is found in U.S. Pat. No. 1,763,842, issued June 17, 1930 to Bibby.

Another form of grid utilizes a series of closed loops each of which have a pair of straight rung portions joined at their opposite ends by loops. An example of such a coupling is found in U.S. Pat. No. 3,196,635, issued July 27, 1965 to Schmitter. Still another form of grid uses alternate U-shaped spring grid elements (see U.S. Pat. No. 2,555,909, issued June 5, 1951 to Wellauer).

In the flexible grid coupling the slots can have parallel sides with the rung portions of the grid having complimentary rectangular cross-sections. Alternatively, the sides of the slots may taper outwardly and the cross-section of the grid rungs may have a mating taper, as shown for example in U.S. Pat. No. 3,079,773, issued Mar. 5, 1963 to Schmitter.

In the prior flexible grid couplings, the grids are typically made of a metal, usually steel, which is heat treated to harden the grid and provide it with sufficient strength and resistence to fatigue because of the continual reversal of loads to which it is subjected. Heretofore, the grids have first been formed into shape and then heat treated to harden the grid. The heat treatment to harden the grid could not precede bending or forming because it would have been impracticable if not impossible to bend the hardened grid stock. Furthermore, the heat treating is needed to relieve stresses which are built up during the forming of the grid. The particular process used involved first bending the grid and then inserting it in a fixture to hold it during the heat treatment process. Inaccuracy in the grid results from the forming of the grid by reason of inaccuracies in machine set-up and worn dies, and also from the heat treatment which distorts the form of the grid. As a result, the formed and heat treated grid will not seat properly in the slots so that the rungs will be forced to carry unequal loads and stresses will tend to concentrate.

My invention employs a flexible grid which includes a series of straight metal rungs held at each of their ends in an elastomer member. The straight lengths forming the rungs can be heat treated to harden the grids before being cut into lengths and bonded to the elastomer members. The elastomer members provide a mechanism for holding the rungs during assembly, will accommodate misalignment between the couplings halves, and will not themselves impose loads upon the rungs.

SUMMARY OF THE INVENTION

In accordance with the invention I provide an improved coupling for connecting driving and driven shafts which includes a pair of hubs connectable to the respective shafts for rotation therewith, with each hub having a plurality of axially extending teeth whose adjacent side faces define slots therebetween, together with a grid forming the torque transmitting element between the hubs, such grid member including a plurality of straight metal rungs received in the slots and spanning the space between the hubs, and an elastomer member joining the rungs together at each of their ends.

Further in accordance with the invention there is provided, as a new article of manufacture, a grid for a flexible coupling which includes a series of generally parallel, spaced, straight metallic rungs having their adjacent ends joined together by elastomer members.

It is the principal object of the invention to provide an improved grid for a flexible coupling which is more economical to manufacture and which will be subjected to a more equal distribution of stresses during use than those heretofore employed.

It is another object of the invention to provide such a coupling grid in which the rungs which carry the torsional load between the hubs are formed from straight sections of heat treated metal which require no forming or bending.

The foregoing and other objects and advantages of the invention will appear in the detailed description which follows. In the description, reference is made to the accompanying drawings which show preferred embodiments of the invention.

DESCRIPTION OF THE PREFERRED EMBODIMENTS

Figure 1:
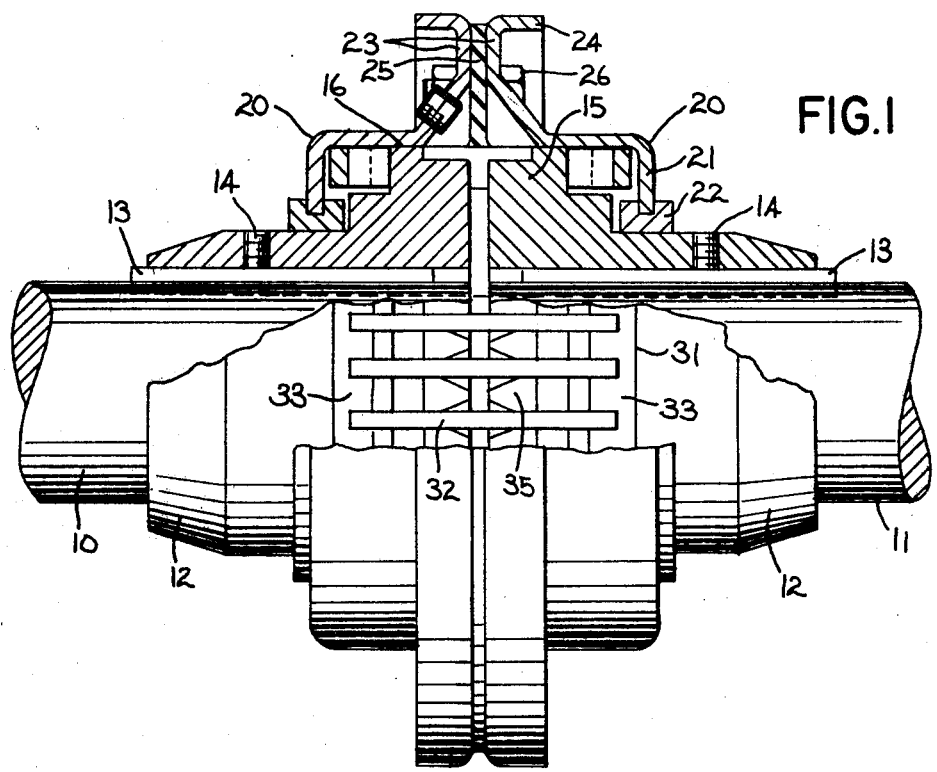
FIG. 1 is a view in elevation, and partly in section, of a coupling including the improved grid of the present invention.
Figure 2:
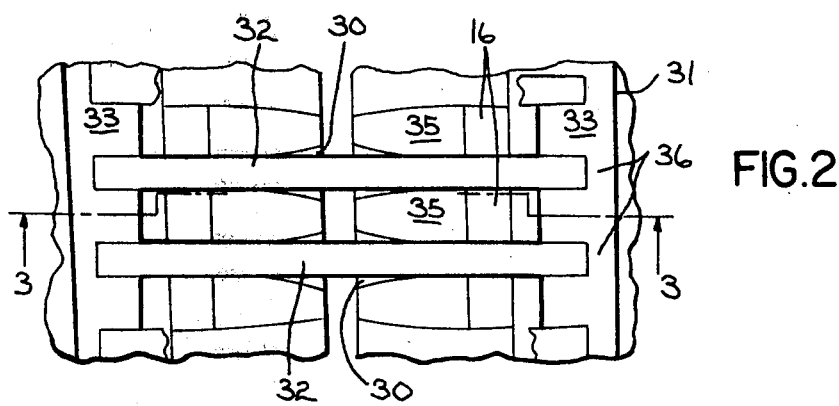
FIG. 2 is a fragmentary view in elevation of the coupling teeth and interlinking grid in accordance with this invention.
Figure 3:
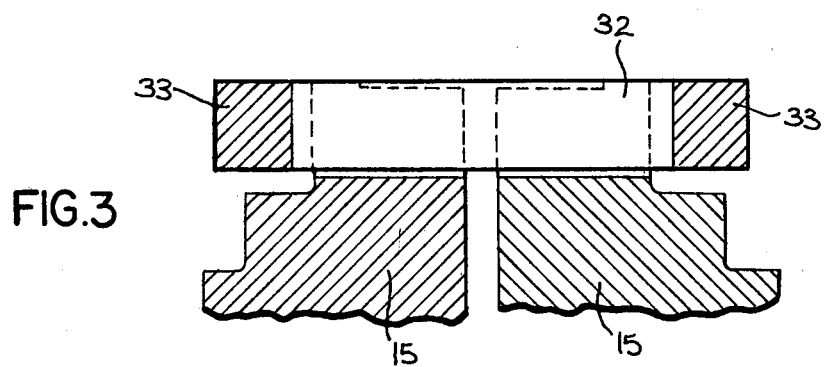
FIG. 3 is a view in section taken in the plane of the line 3—3 of FIG. 2.
Figure 4:
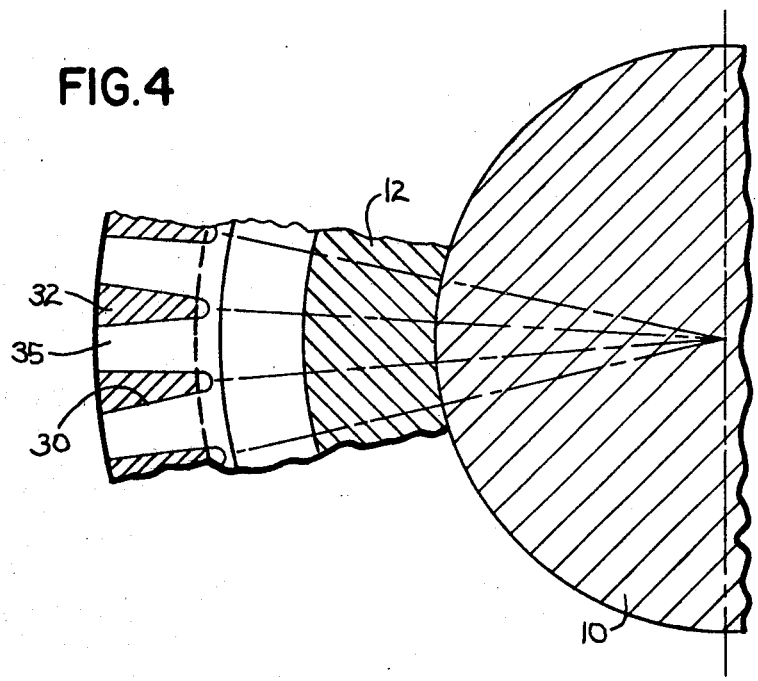
FIG. 4 is a fragmentary view in elevation of the interior face of a hub showing the rungs of the grid seated therein.

A flexible coupling incorporating the improved grid of the present invention acts as a connection between a driving shaft 10 and a driven shaft 11. The coupling comprises a pair of similar hubs 12 which are bored to receive the shafts 10 and 11. The hubs 12 are each provided with slots to receive keys 13 which are also received in cooperating slots provided in the shafts 10 and 11 to thereby assure rotation of the hubs 12 with their respective shafts. To prevent axial movement of the hubs 12 relative to their respective shafts, set screws 14 permit the fixing of the hubs 12 relative to the keys 13.

Each hub 12 includes a flange 15 extending peripherally about that portion of the hub adapted to be in facing relationship with the adjacent hub. The circumference of each flange 15 defines a raised cover supporting surface 16.

Suitable coupling cover members, which may be identical and which are designated generally by the numeral 20, are provided to act as a shield to prevent the entry of dust and grit and also to act as a lubricant retainer housing for the coupling. Each cover member 20 has an inwardly bent portion 21 which is seated in a resilient sealing ring 22 disposed about the periphery of the respective hub member 12. The resilient sealing ring 22 may be formed of rubber, neoprene or other resilient material resistent to deterioration in the presence of lubricants. Each cover member 20 also includes an upwardly bent flange portion 23 and an outwardly bent flange portion 24. As may be seen in FIG. 1, the flange portions 23 of the cover members 20 are adapted to be placed in facing relation separated by a gasket 25. The cover members 20 are held in such relation by a plurality of bolts 26 received in aligned holes provided in the flange portions 23 and the gasket 25. As thus viewed, a coupling cover is formed of the two cover members 20 secured together and supported on the hubs 12 by the sealing rings 22 and supporting surfaces 16 of the flanges 15. The cover may also include an aperature (not shown) for the introduction of lubricant under pressure to its interior.

The flanges 15 of the hubs 12 are each provided with a series of radially spaced, axially directed slots 30 which are adapted to receive an interconnecting grid 31. The grid receiving slots 30 may be formed to receive grids having either rectangular or tapered cross-sections. For purpose of illustration only, a tapered grid is shown. The grid 31 includes a series of spaced, straight metal rungs 32 connected at their two ends to adjacent rungs by a pair of elastomer members 33. The slots 30 form a series of peripherally spaced coupling teeth 35 having side walls which are provided with curved surfaces, in a known manner. The axes of revolution of the side walls of the teeth 35 lie in a plane perpendicular to the axis of the shafts 10 and 11. The curvature of the side walls is shown exaggerated in the drawings for clarity.

When the coupling is subjected to a torque load, the straight rungs 32 of the grid 31 will contact the side walls of the teeth 35 and act as the torque transmitting elements between the hubs 12. As the torque load on the coupling increases, the hub members 12 will assume an increased angular displacement relative to each other and will thereby cause the straight rungs 32 of the grid member 31 to advance their contact along the curved sides of the teeth towards the space between the hubs 12. This produces the known result of decreasing the unsupported span of the rungs 32 which function essentially as short beams. Thus, as the load increases, the unsupported length of the rungs decreases and the grid member becomes stiffer and increasingly restrains angular displacement of the coupling halves.

In addition to providing torsional flexibility, the grid 31 will accept parallel, angular, and axial misalignments by reason of the rungs 32 being capable of so seating themselves within the slots 30 to properly join the two coupling halves. To assist in accepting such misalignments, the slots 30 and metal rungs 32 are lubricated so that there can be a sliding of the rungs 32 within the slots 30.

The elastomer members 33 function to hold the straight rungs 32 in place during assembly of the coupling so that a group of rungs 32, or the entire series of rungs, can be assembled as a unit. The elastomer members 33 also function as axial stops limiting the movement of the grid 31 in both axial directions. The elastomer members 33 provide the necessary flexibility to allow the rungs to deflect under load and to properly seat themselves between misaligned coupling halves. The elastomer members 33 do not themselves impose any significant load or stress upon the rungs 32, particularly when compared with the metallic loops found in the serpentine or closed loop grids of the prior art.

In manufacturing the grid 31, the rungs 32 can be cut from straight stock material which has been heat treated or they can be heat treated after being cut. In either case, there are no bending stresses or forming stresses which are created. The straight sections of rungs 32 can be sheared in the smaller sizes and cut off with an abrasive wheel for larger sizes. The straight sections are then assembled in a mold and the elastomer members 33 are molded on the ends of the rungs 32. Urethane, either polyester or polyether, is the preferred material for the elastomer members 33. Other suitable viscoelastic materials may be used such as epoxies, phenolics, polycarbonates, silicones, polyethylene and various grades of Nyloc.

Figure 5:
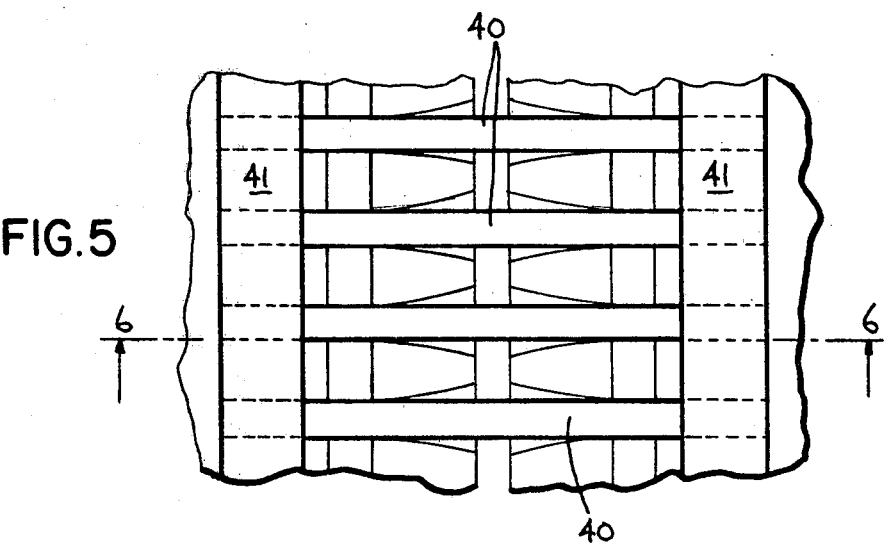
FIG. 5 is a view similar to FIG. 2 but showing a modified form of the grid.
Figure 6:
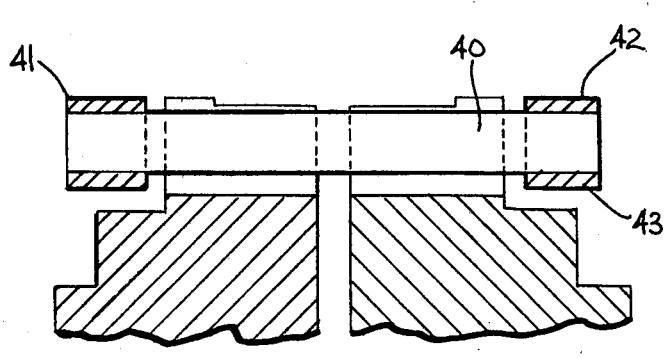
FIG. 6 is a view in section taken in the plane of the line 6—6 of FIG. 5.

In the form of grid illustrated in FIGS. 1 through 4, the elastomer members 33 have a depth which is the same as the height of the rungs 32 and the members 33 extend beyond the ends of the rungs 32 to form portions 36 which bridge the ends of the rungs 32. In that construction the bridging portions 36 function to hold the rungs in place and assist the bonding which will occur between the surfaces of the rungs 32 and the elastomer member 33. In the embodiment illustrated in FIGS. 5 and 6, the ends of the straight metal rungs 40 extend through the elastomer members 41 and the elastomer members 41 are formed with a depth which exceeds the height of the rungs so that bridging portions 42 and 43 are formed above and below the rungs 40. Other arrangements of encapsulating the ends of the straight metallic rungs in elastomer members will occur to those skilled in the art.

Depending upon the size of the coupling, the grid can be formed flat or the elastomer members of the grid can be formed with a curvature which conforms to the circumference of the flange 15 in the hubs 12. The smaller the coupling size the more necessary it will be to mold a curvature into the elastomer members 33. In the larger sizes of coupling the curvature which must be accepted by the grid can be taken up in the flexibility of the elastomer members and they can, therefore, be manufactured and formed flat.

The flat grids can be stocked by simply wrapping them on spools and cutting the grids to proper lengths as needed. The grid can be a one piece configuration or it can be formed for a particular coupling as a number of sectors which together form a complete circle of grid.

I claim:

1. In a flexible coupling including a pair of hubs each having a plurality of axially extending teeth whose adjacent side faces define slots therebetween, and a grid joining the hubs, the improvement wherein:
the grid includes a plurality of straight metal rungs received in the slots and spanning the space between the hubs, the ends of said rungs extending axially beyond the teeth of the pair of hubs, and elastomer members joining together the ends of the rungs to form a unitary structure with said rungs.

2. A coupling in accordance with claim 1 wherein the elastomer members each have portions which surround the axial ends of the rungs and span the space between adjacent rungs.

3. A flexible coupling in accordance with claim 1 wherein the elastomer members are each formed with portions which surround the top and bottom of the ends of the rungs and span the space between adjacent rungs.

4. A flexible shaft coupling comprising:

a pair of hubs each adapted to be secured to one of the shafts to be coupled, each of said hubs having a series of teeth which define slots therebetween; and a unitary grid including a series of spaced, generally parallel metal rungs received in said slots and spanning the space between said slots, said rungs also extending beyond said slots in both directions away from said space so that their ends lie outside said slots; and an elastomer member joining the ends of said rungs.

* * * * *